(12) United States Patent
Stillman

(10) Patent No.: US 8,155,974 B2
(45) Date of Patent: Apr. 10, 2012

(54) METHODS AND SYSTEMS FOR OBTAINING PROFILE INFORMATION FROM INDIVIDUALS USING AUTOMATION

(75) Inventor: Scott Stillman, Peachtree City, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1350 days.

(21) Appl. No.: 10/610,045

(22) Filed: Jun. 30, 2003

(65) Prior Publication Data

US 2005/0014117 A1 Jan. 20, 2005

(51) Int. Cl.
*G06Q 10/00* (2012.01)
(52) U.S. Cl. ......................................................... 705/1.1
(58) Field of Classification Search ........................ 705/1
See application file for complete search history.

(56) References Cited

U.S. PATENT DOCUMENTS

| | | | |
|---|---|---|---|
| 5,918,222 A * | 6/1999 | Fukui et al. ........................ | 707/1 |
| 6,212,502 B1 * | 4/2001 | Ball et al. ........................ | 704/270 |
| 6,411,687 B1 * | 6/2002 | Bohacek et al. ........... | 379/88.21 |
| 6,721,706 B1 * | 4/2004 | Strubbe et al. ................ | 704/275 |
| 2002/0004757 A1 * | 1/2002 | Torres et al. .................... | 705/26 |
| 2004/0093257 A1 * | 5/2004 | Rogers et al. ................... | 705/10 |

OTHER PUBLICATIONS http://encarta.msn.com/encnet/features/dictionary/Dictionary Results.aspx?refid=1861620253.*
U.S. Appl. No. 10/610,266, entitled "Automated Methods and Systems for Assisting Customers in Making Purchases Utilizing Verbal Communication," filed Jun. 30, 2003; Inventor: Scott Stillman.
U.S. Appl. No. 10/603,403, entitled "Method and Systems for Assisting in Real Estate Transactions With Automation Utilizing Verbal Communication,:" filed Jun. 24, 2003, Inventors: David Anderson; Senis Busayapongchai.
U.S. Appl. No. 10/603,448, entitled "Methods and Systems for Assisting Scheduling With Automation," filed Jun. 24, 2003, Inventors: David Anderson; Robert A. Koch.
U.S. Appl. No. 10/603,724, entitled "Methods and Systems for Establishing Games With Automation Using Verbal Communication," filed Jun. 24, 2003, Inventors: David Anderson; Senis Busayapongchai.
"i3 Mobile & Nuance," *ASRNews—Automatic Speech Recognition*, vol. 13, No. 8, Aug. 2002, Contact: Gwen Murphy.
"RezConnect," *ASRNews—Automatic Speech Recognition*, vol. 11, No. 2, Feb. 2000, Contact: Michael Brent.
"EbizPortals Bring Shopping to netECHO," *ASRNews—Automatic Speech Recognition*, vol. 12, No. 3, Mar. 2001, Contact: Dr. Emdad Khan.
"ViaFone & Ticketmaster," *ASRNews—Automatic Speech Recognition*, vol. 11, No. 7, Jul. 2000, Contact: Emily Cohen.
"CommWorks Enhances UC," *ASRNews—Automatic Speech Recognition*, vol. 13, No. 4, Apr. 2002, Contact: Steven M. Ostrowski; John Leikness.
"Fandango Provides Movie Tickets," *ASRNews—Automatic Speech Recognition*, vol. 13, No. 1, Jan. 2002, Contact: Sallie Green, Fandango.

* cited by examiner

*Primary Examiner* — Gabrielle McCormick

(57) ABSTRACT

Methods and systems obtain profile information from individuals using automation to select and provide the questions that are given to the individual. The answers the individuals provide to the questions can then be used to generate the profile information. Subsequent questions are selected and presented according to analysis of the previous answers. The exchange of the questions and answers occurs over a communications network and may take the form of emails, web page interfaces, wireless data messages, or verbal communication over a voiced call. The answers are analyzed to determine certain characteristics, such as the personality type, mood, and gender of the individual. The subsequent questions are selected based on the characteristics that are found from the answers to facilitate the information exchange between the automated system and the individual.

23 Claims, 2 Drawing Sheets

METHODS AND SYSTEMS FOR OBTAINING PROFILE INFORMATION FROM INDIVIDUALS USING AUTOMATION

TECHNICAL FIELD

The present invention is related to information gathering with automated systems. More particularly, the present invention is related to obtaining profile information from individuals with automation where the profile information is applied for subsequent uses.

BACKGROUND

Various automated services may be provided for individuals that are specialized for the particular preferences and situation of each individual. For example, an automated system may assist in making purchases for an individual such as automatically purchasing flowers each year on a birthday through an electronic transaction. As another example, an automated system may assist in setting up a dinner reservation for an individual through an electronic transaction. For these transactions, individual specific information must be known, such as the date and type of flowers to purchase or the time and place to schedule the reservation as well as the smoking preference.

Profile information for individuals may specify the preferences and factual scenarios such as birthdays of interest for an individual. This profile information may be accessed by automated systems when assisting with purchases, scheduling, etc. so that the individual is not required to provide this information for each task being performed. However, this profile information must be acquired from the individual before it can be put to use by the automated systems.

Acquiring such profile information can be a tedious task. An individual could be asked to complete a questionnaire. However, the information that is relevant to services to be provided for a particular individual at any given time may be difficult to anticipate such that a script of questions intended to elicit that information cannot be prepared in advance. Furthermore, the amount of information may be lengthy such that the individual is required to remain focused on answering numerous questions for an uncomfortable period. As a result the individual may become agitated and may provide hasty answers that are not useful to building the profile for the individual.

SUMMARY

Embodiments of the present invention address these issues and others by providing methods and systems that obtain information from individuals using automation. These embodiments present questions and analyze the answers that are received. The analysis of answers provides the basis for the selection of the next questions to be asked so that the questioning of the individual can effectively proceed.

One embodiment is a method of obtaining profile information from individuals using automation. The method involves providing a first question to an individual over a communication network from a network-based computer-implemented application. A first answer to the first question is received from the individual over the communication network at the network-based computer-implemented application. The first answer is analyzed with the network-based computer-implemented application, and based on the analysis of the first answer, a second question is selected and provided to the individual over the communication network from the network-based computer-implemented application.

Another embodiment is a system for obtaining profile information from individuals using automation. The system includes a profile database storing profile information for an individual. A network-based computer-implemented application is linked to the individual by a communication network. The network-based computer-implemented application is configured to provide a first question to the individual over the communication network and also receive a first answer from the individual over the communication network. The network-based computer-implemented application analyzes the first answer to select a second question and provides the second question to the individual over the communications network. A second answer to the second question is received over the communications network and profile information is determined from the first and second answers. The profile information is stored in the profile database.

DETAILED DESCRIPTION

Embodiments of the present invention provide an individual with a network-based service that obtains profile information from the individual so that the other network-based services may utilize the profile information when performing automated tasks for the individual. The individual is thereby relieved from manually filling out tedious questionnaires with fixed sets of questions. Also, the questions are presented to the individual while accounting for the manner in which the individual is responding so that the questions can be tailored to minimize the aggravation to the individual.

Figure 1:
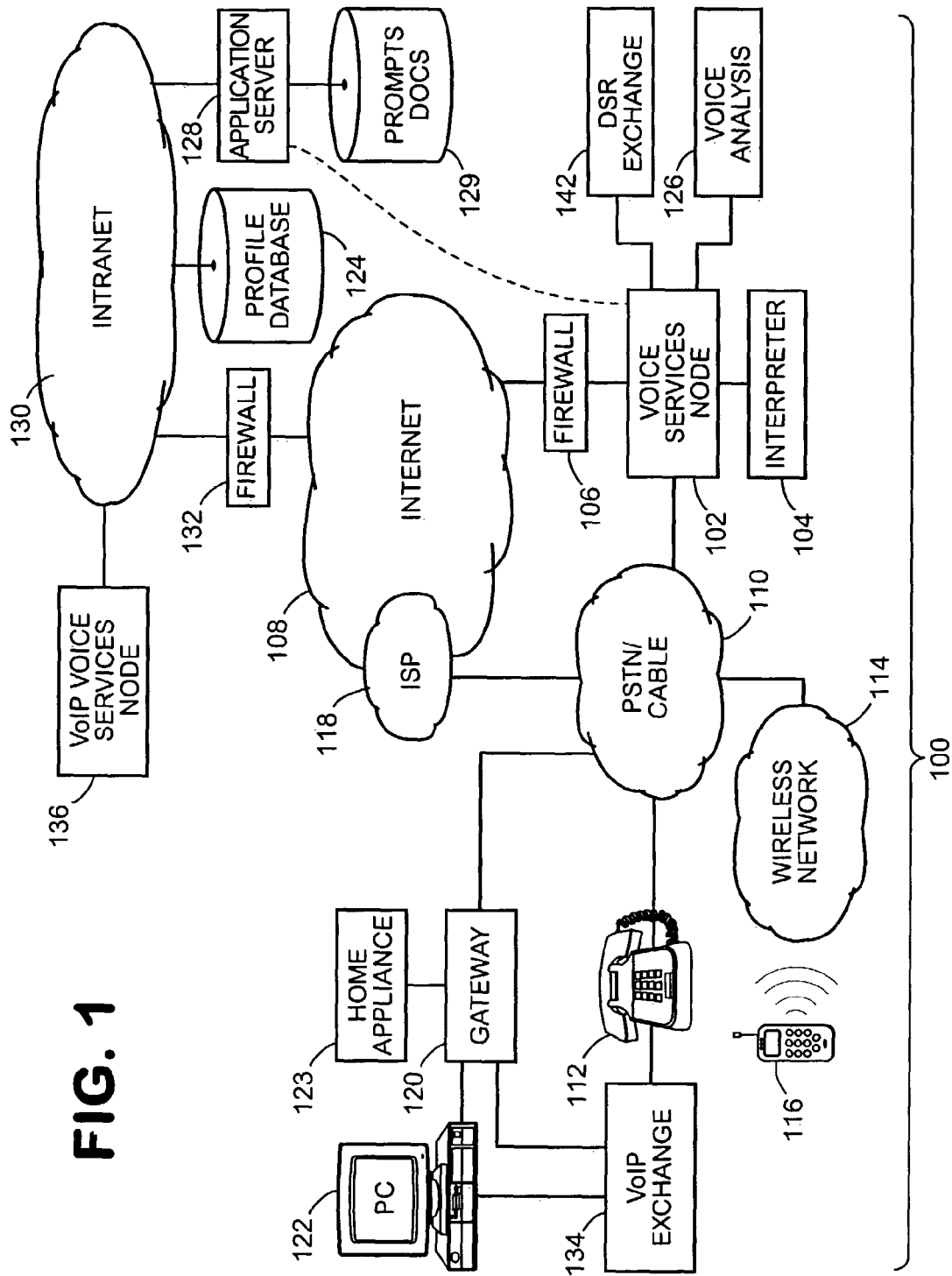
FIG. 1 shows one illustrative embodiment of a system for obtaining profile information from individuals.

FIG. 1 illustrates one example of an encompassing communications network 100 interconnecting communications devices of the individual with the network-based system that automates the profile building process. The individual may access the system through several different channels of communication including both data communication and verbal communication. As discussed below, the individual communicates verbally with a voice services node that may be present in various locations for different embodiments.

As one example, the individual may place a conventional voiced telephone call from a telephone 112 through a network 110 for carrying conventional telephone calls such as a public switched telephone network ("PSTN") or adapted cable television network. The call terminates at a terminating voice services node 102 of the PSTN/cable network 10 according to the number dialed by the individual. This voice services node 102 is a common terminating point within an advanced intelligent network ("AIN") of modern PSTNs or adapted cable networks and can be implemented as a soft switch and media server combination.

Another example of accessing the system is by the individual placing a voiced call from a wireless phone 116. The wireless phone 116 maintains a wireless connection to a wireless network 114 that includes base stations and switching centers as well as a gateway to the PSTN 110. The PSTN 110 then directs the call from the wireless phone 116 to the voice node 102 according to the number dialed by the individual on the wireless phone 116. Furthermore, the wireless phone 116 may function as a thin client device relative to the verbal functions of the automated profile building system such that the wireless phone 116 implements a distributed speech recognition ("DSR") platform to minimize the information transmitted through the wireless connection. The DSR platform takes the verbal communication received from the individual at the wireless device 116 and generates parameterization data from the verbal communication. The DSR platform then transmits the parameterization data as the verbal communication to the voice service node 102 or 136 rather than all the data representing the verbal communications. The voice services node 102 or 136 then utilizes a DSR exchange function 142 to translate the DSR parameterization data into representative text which the voice services node 102 or 136 can deliver to an application server 128.

Another example of accessing the system is by the individual placing a voiced call from a voice-over-IP ("VoIP") based device such as a personal computer 122 or where telephone 112 is a VoIP phone. This VoIP call from the individual may be to a local VoIP exchange 134 which converts the VoIP communications from the individual's device into conventional telephone signals that are passed to the PSTN 110 and on to the voice node 102. The VoIP exchange 134 converts the conventional telephone signals from the PSTN 110 to VoIP packet data that is then distributed to the telephone 112 or computer 122 where it becomes verbal information to the individual.

The VoIP call from the individual may alternatively be through an Internet gateway 120 of the individual, such as a broadband connection, to an Internet Service Provider ("ISP") 118. The ISP 118 interconnects the gateway 120 of the individual to the Internet 108 which then directs the VoIP call according to the number dialed, which signifies an Internet address of a voice node 136 of an intranet 130 from which the automated service is provided. The voice services node 136 has the same capabilities as voice services node 102 like advanced speech recognition and text-to-speech, but is accessed over a VoIP network such as the Internet 108. As shown, the voice services node is included within an intranet 130 that is protected from the Internet 108 by a firewall 132. The voice service node 136 includes a VoIP interface and is typically implemented as a media server which performs the VoIP-voice conversion such as that performed by the VoIP exchange 134. However, as discussed above, the voice services node 136 also performs text-to-speech and speech recognition such as that performed by the voice node 102 and discussed below. Accordingly, the discussion of the functions of the voice services node 102 also applies to the functions of the voice service node 136.

As yet another example, the wireless device 116 may be a wireless data device such as a personal digital assistant. The wireless device 116 and/or personal computer 122 may have a wi-fi wireless data connection to the gateway 120 or directly to the wireless network 114 such that the verbal communication received from the individual is encoded in data communications between the wi-fi device of the individual and the gateway 120 or wireless network 114.

Another example of accessing a voice services node 102 or 136 is through verbal interaction with an interactive home appliance 123. Such interactive home appliances may maintain connections to a local network of the individual as provided through a gateway 120 and may have access to outbound networks, including the PSTN/cable network 110 and/or the Internet 108. Thus, the verbal communication may be received at the home appliance 123 and then channel via VoIP through the Internet 108 to the voice services node 136 or may be channeled via the PSTN/cable network 110 to the voice services node 102.

Yet another example provides for the voice services node to be implemented in the gateway 120 or other local device of the individual so that the voice call with the individual is directly with the voice node within the individual's local network rather than passing through the Internet 108 or PSTN/cable network 110. The data created by the voice node from the verbal communication from the individual is then passed through the communications network 100, such as via a broadband connection through the PSTN/cable 110 and to the ISP 118 and Internet 108 and then on to the application server 128. Likewise, the data representing the verbal communication to be provided to the individual is provided over the communications network 100 back to the voice node within the individual's local network where it is then converted into verbal communication provided to the individual.

The voice services node 102 provides text-to-speech conversions to provide verbal communication to the individual over the voiced call and performs speech recognition to receive verbal communication from the individual. Accordingly, the individual may carry on a natural language conversation with the voice services node 102. To perform these conversations, the voice services node 102 implements a service control logic written in a language such as or similar to the well-known voice extensible markup language ("VoiceXML") context which utilizes a VoiceXML interpreter function 104 of the voice services node 102 in conjunction with VoiceXML documents. An alternative language for the control logic is the speech application language tags ("SALT") platform. The interpreter function 104 operates upon the VoiceXML or SALT documents to produce verbal communication of a conversation. The VoiceXML or SALT document provides the content to be spoken from the voice node 102. The VoiceXML or SALT document is received by the VoiceXML or SALT interpreter function 104 through a data network connection of the communications network 100 in response to a voiced call being established with the individual at the voice node 102. This data network connection as shown in the illustrative system of FIG. 1 includes a link through a firewall 106 to the Internet 108 and on through the firewall 132 to the intranet 130.

The verbal communication from the individual is received at the voice node 102 and is converted into data representing each of the spoken words through a conventional speech recognition function of the voice node 102. The VoiceXML or SALT document that the VoiceXML or SALT interpreter function 104 is operating upon sets forth a timing of when verbal information that has been received and converted to data is packaged in a particular request back to the VoiceXML or SALT document application server over the data network. This timing provided by the VoiceXML or SALT document allows the verbal responses of the individual to be matched with the verbal questions and responses of the VoiceXML or SALT document. Matching the communication of the individual to the communication from the voice node enables an application server 128 of the intranet 130 to properly act upon the verbal communication from the individual. As shown, the application server 128 may interact with a voice node through an intranet 130, through the Internet 108, or through a more direct network data connection as indicated by the dashed line.

The voice node 102 may also employ a voice analysis application 126. The voice analysis application 126 allows various qualities of the individual's speech to be analyzed such as the energy, frequency, and various other speech parameters. For example, the tonal qualities of the speech can be analyzed to determine the gender of the individual as well as the individual's current mood. This information is delivered back to the application server 128 as data along with the data representative of the words that are spoken. The application server 128 may then analyze the qualities of the individual's speech along with the spoken content to determine which question(s) to subsequently present to the individual and when they should be presented. For example, the voice analysis application 126 may provide data to the application server 128 indicating that the individual is frustrated, such as because the individual's voice pitch has substantially increased. The application server 128 follows up by terminating the current session or asking a general question requiring a simple answer now while waiting until a subsequent session to ask a question for a current subject matter that requires a detailed answer.

The application server 128 is a conventional computer server that implements an application program to control the automated profile building service for the individual. Where verbal communication is utilized to communicate with the automated profile building service, the application server 128 provides the VoiceXML or SALT documents to the voice node 102 to bring about the conversation with the individual over the voiced call through the PSTN/cable network 110 and/or to the voice node 136 to bring about the conversation with the individual over the VoIP Internet call. The application server 128 may additionally or alternatively provide files of pre-recorded verbal prompts to the voice node where the file is implemented to produce verbal communication. The application server 128 may store the various pre-recorded prompts, grammars, and VoiceXML or SALT documents in a database 129. The application server 128 also interacts with a customer profile database 124 that stores the profile information for each individual that is acquired through the profile building process.

In addition to providing VoiceXML or SALT to the one or more voice nodes of the communications network 100, the application server 128 may also serve hypertext markup language ("HTML"), wireless application protocol ("WAP"), or other distributed document formats depending upon the manner in which the application server 128 has been accessed so as to provide for non-verbal communication with the individual. For example, an individual may choose to communicate with the application server to build the profile information by accessing a web page provided by the application server to the personal computer 122 through HTML or to the wireless device 116 through WAP via a data connection between the wireless network 114 and the ISP 118. Such HTML or WAP pages may provide a template for entering information where the template asks a question and provides an entry field for the individual to enter the answer that will be stored in the profile database 124 and/or will be used to determine the next question to provide on the template to seek further information from the individual.

The profile database 124 contains the preference information that has been provided by the individual through the profile building process. The profile database 124 may contain many categories of information for an individual. For example, the profile database 124 may contain payment preferences of the individual such as various credit accounts to be used. The profile database 124 may contain item preferences such as the permissible brands of products and services to be purchased and the permissible vendors that the purchase may be made from. As a specific example, the profile database 124 may specify the type of flowers to be automatically purchased each year on Valentine's Day and/or on a birthday. Additionally, the customer profile may specify the range of acceptable prices for the goods and services to be purchased.

As shown in FIG. 1, the profile database 124 may reside on the intranet 130 for the network-based profile building service. However, the profile database 124 likely contains information that the individual considers to be sensitive, such as the credit account information. Accordingly, an alternative is to provide customer profile database storage at the individual's residence or place of business so that the individual feels that the profile data is more secure and is within the control of the individual. In this case, the application server 128 maintains an address of the customer profile database storage maintained by the individual rather than maintaining an address of the customer profile database 124 of the intranet 130 so that it can access the profile data as necessary.

Figure 2:
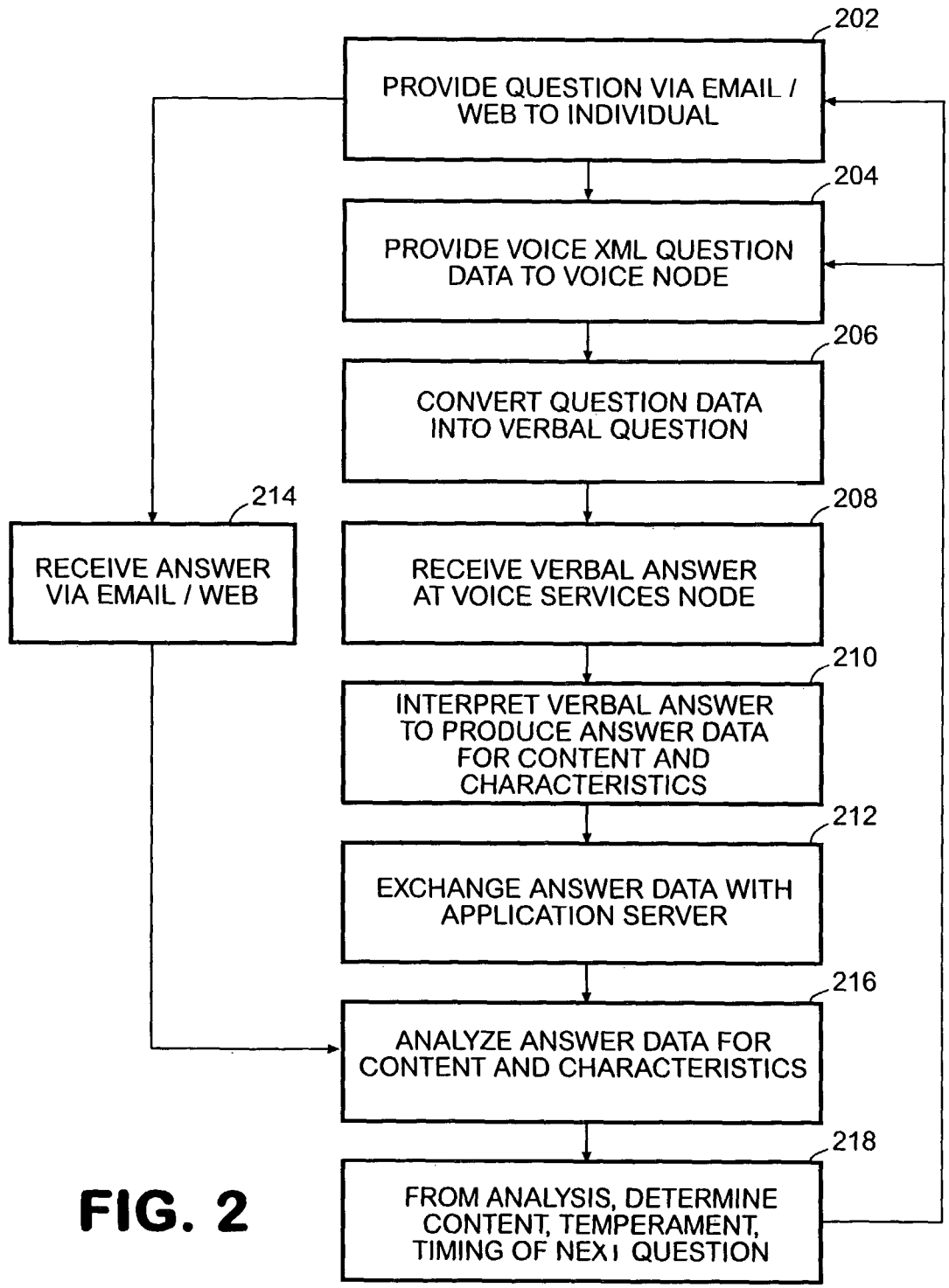
FIG. 2 illustrates one set of logical operations that may be performed within the system of FIG. 1 to obtain the profile information.

FIG. 2 illustrates one example of logical operations that may be performed within the communications network 100 of FIG. 1 to bring about the automated profile building process for the individual. This set of logical operations is provided for purposes of illustration and is not intended to be limiting. For example, these logical operations discuss the application of VoiceXML within the communications network 100 where verbal communication occurs between the profile building system and the individual. However, it will be appreciated that alternative platforms for distributed, text-to-speech and speech recognition may be used in place of VoiceXML, such as SALT as discussed above.

The logical operations of FIG. 2 may begin at question operation 202 where the application server distributes a question to the individual via email, other data messaging, or via a web template. Upon the first iteration where the first message has been sent to the individual or the individual has first visited the web page, then instructions may be provided to the individual to guide the individual in completing answers to the questions, such as by stating that the individual may answer in as general or detailed terms as desired and may terminate the question and answer session whenever the individual chooses. An example of an initial question may be to state the services that the individual will be using for which the customer profile information will be applicable. Another example of an initial question may be for the individual to identify himself or herself. When the logical operations begin at question operation 202, then operational flow proceeds to answer operation 214.

At answer operation 214, the individual enters an answer to the question that has been presented when convenient for the individual. The answer is provided in a reply email or other data message or by entering text within the template of the web page. The individual may answer in general or detailed terms. For example, when asked which services the customer profile information will be applicable to, the individual may respond in general terms by entering only the basic name of each of the desired services. The individual may choose to respond in more detailed terms by elaborating on the services by also specifying key preferences for each of the services that should be contained within the profile database. As another example, when asked to identify himself or herself, the individual may simply enter the individual's name or may choose to elaborate by specifying name, age, and gender. After the individual provides the answer, operational flow transitions to analysis operation 216.

The logical operations may alternatively begin at transfer operation 204 where the application server provides questions in the form of VoiceXML documents to a voice node that has established a voiced call with the individual. The voiced call may be established at the initiative of the individual by dialing a number for the profile building service which results in a connection to the voice node. Alternatively, the voiced call may be established at the initiative of the application server by instructing the voice node to place a call to a known number for the individual.

Where the individual places the voiced call to the voice node such as by dialing the number for the profile building service for the voice services node on the communications network or by selecting an icon on the personal computer where the voiced call is placed through the computer. The voice node accesses the appropriate application server according to the voice call (i.e., according to the number dialed, icon selected, or other indicator provided by the individual). Utilizing the dialed number or other indicator of the voice call to distinguish one application server from another allows a single voice node to accommodate multiple verbal communication services simultaneously. The voice node may provide identification data to the application server for the individual based on the received caller ID information for the individual which allows the application server to create or access an existing profile for the individual.

Alternatively, the voice node may implement a standard VoiceXML introduction page to inform the individual that he has dialed into the service and ask that the individual say his formal name or other form of identification, such as a user name and password. This identification can then be captured as data and provided back to the application server where it is utilized to create or access an existing profile for the individual.

Once the voice node receives the VoiceXML document from the application server, it is interpreted at speech operation 206 to convert the VoiceXML text to speech that is then verbally provided to the individual over the voiced call. This verbal information may provide further introduction and guidance to the individual about using the system. This guidance may inform the individual that he can barge in at any time with a question or with an instruction. The guidance may also specifically ask that the individual provide a verbal answer to each question and that the verbal answer may be in as general or detailed terms as the individual chooses. The initial question is then provided verbally to the user. The speech from the voice node may begin in a neutral tone and pace that may later be altered for subsequent questions depending upon analysis of the verbal answers received from the individual.

Eventually, the voice node receives a verbal answer from the individual at answer operation 208. The content of the verbal answer may be in general terms or may be detailed. For example, the verbal answer may be a one word, yes or no type of answer or the verbal answer may be several sentences that elaborate. Furthermore, the speech will have various characteristics such as pace and tonal qualities. The verbal answer is interpreted through speech recognition at the voice node to produce answer data that represents the words spoken by the individual at recognition operation 210. This data is representative of the words spoken by the individual that are obtained within a window provided by the VoiceXML document for receiving verbal answers so that the application server can determine from keywords of the answer data what the individual wants the service to do.

The voice node also analyzes the voice characteristics of the verbal answer to quantify the characteristics such as pace and tonal quality to produce additional answer data. For example, the verbal answer may be slow and relatively low pitched indicating that the individual is in a calm mood and may be willing to participate for a while or may be fast and high pitched indicating that the individual is in an agitated mood and likely wants to be done with the session or the current line of questioning as soon as possible. Furthermore, the frequency content of the voice allows the gender to be estimated so that the gender specific questioning can be selected without specifically asking about gender and/or without receiving a specific answer about gender.

The answer data including the content of the verbal answer as well as the voice characteristics is transferred from the voice node over the data network to the application server at exchange operation 212. Operational flow then transitions to analysis operation 216 where the application server analyzes the answer data for the content and characteristics. Based on this analysis, the application server can then select the appropriate follow-up question with the individual from a hierarchy of question content, temperament, and timing. Such selection is discussed below with reference to selection operation 218. In addition to analyzing the answer data so that the next question can be determined, the application server also analyzes the answer data to determine whether the content of the answer is appropriate for storage within the profile database for use by automated services performing tasks for the individual. For example, certain answers may be too vague or general to be useful and are not stored while other answers may directly address a category of information of the profile database. The answers adequately addressing a category of information of the profile database are stored for the appropriate category and for the individual.

Where the communication with the individual is text-based rather than verbal, then the characteristics of the text-based answer are analyzed for the length of the answer and the particular vocabulary used for the answer. For example, if the answers consist of only a few short words, then the application server may detect that the individual is in an agitated mood or that the individual does not type effectively. Where the communication with the individual is verbal, then the characteristics of the verbal answer are analyzed including the length of the answer as well as the voice characteristics discussed above that have been identified by the voice analysis at the voice node. For example, the application server may recognize from the answer data that the verbal answer was lengthy, high-pitched, and fast paced which may indicate that the individual is not agitated with the questioning but that the individual has a personality that involves speaking quickly in a relatively high voice.

From the analysis, the application server then chooses the next content, temperament, and timing of the next question from the hierarchy of question options at selection operation 218. For example, where the analysis has indicated that the individual is agitated, such as due to a verbal answer that had a higher pitch, faster pace, and less content than normal for this individual, then the application server may select a verbal question that requires only a yes or no answer, that is provided in a very soft-spoken voice presentation with a moderate pace from the voice services node, and is provided immediately. For example, the application server can provide a yes or no question immediately which can mean taking place a very short time following the previous question and taking place before any other questions or user interaction, while within the same session. The application server may also select a question that requires a more elaborate answer from the individual, that is provided in a neutral voice presentation in a quickened pace from the voice services node, and is set to be provided upon the next session that occurs between the automated profile building system and this individual.

The selection of questions may be based on statistical modeling that allows correlations of characteristics to be established. For example, the tonal qualities of speech may be correlated with mood and/or gender, while length of response may be correlated with mood and/or personality. From the correlations resulting, from statistical modeling, the hierarchy of question content, temperament, and timing may be created and stored for application within the automated system.

Upon selecting the appropriate content of a question, as well as selecting the temperament including tone and pace and selecting timing for presentation to the individual, operational flow returns to question operation 202 or transfer operation 204 as appropriate for the current mode of communication with the individual. If the application server has selected that a question be present during the current session, then operational flow immediately continues at question operation 202 or transfer operation 204. Otherwise, operational flow stops until the next session is initiated, and operational flow then restarts at question operation 202 or transfer operation 204.

The automated profile building system allows the individual to communicate with the system at the convenience of the individual and allows the individual to answer in a style that the individual chooses. The automated profile building system adapts to the current style of the individual to choose follow-up questions based on the analysis of the individual's answer. Accordingly, the follow-up questions may be provided with content, temperament, and timing such that the question and answer exchanges proceed in an effective manner as opposed to forcing the individual to answer a fixed set of questions that are not sensitive to the individual's personality, current mood, or other characteristic.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of obtaining individual profile information from an individual during an automated session, the method comprising:
   providing a first system utterance to the individual over a network during an automated session associated with a line of questioning for obtaining the individual profile information;
   receiving a first user utterance in response to the first system utterance from the individual over the network;
   analyzing, via a processor, a temperament, a timing, and a content of the first user utterance to yield an analysis;
   detecting a mood of the individual based on the analysis and whether the mood meets a termination criteria;
   when the mood meets the termination criteria, terminating the line of questioning, continuing the automated session with the individual, and deferring the obtaining of the individual profile information to a subsequent automated session; and
   when the mood does not meet the termination criteria, performing steps comprising:
      providing to the individual a second system utterance based on the analysis of the temperament, the content, and timing for the first user utterance, the second system utterance selected from a hierarchy of questions for the line of questioning organized by question content, temperament criteria, and timing criteria;
      determining whether the first user utterance addresses information in an individual profile database; and
      when the first user utterance adequately addresses the information in the individual profile database, storing the first user utterance in the individual profile database.

2. The method of claim 1, wherein the network comprises a public switched telephone network including a voice services node.

3. The method of claim 2, wherein receiving the first user utterance further comprises:
   receiving a verbal user utterance over voice call at the voice services node;
   converting the verbal user utterance to user utterance data at the voice services node to yield answer data; and
   providing the answer data to a network-based application from the voice services node.

4. The method of claim 3, wherein providing the first system utterance and providing the second system utterance comprises:
   providing first system utterance data and second system utterance data to the voice services node; and
   converting the first system utterance data and the second system utterance data to first and second verbal utterances at the voice services node.

5. The method of claim 1, wherein the network comprises the Internet and the first system utterance and the second system utterance are included in a web page display on a computer linked to the Internet and wherein the first user utterance is entered as text through the web page display.

6. The method of claim 1, wherein the network comprises the Internet and the first system utterance and the second system utterance are emails received at a computer linked to the Internet and wherein the first user utterance is a reply email sent from the computer.

7. The method of claim 1, further comprising:
   receiving a second user utterance in response to the second system utterance from the individual; and
   based on an analysis of the second user utterance, selecting and providing a third system utterance to the individual over the network.

8. The method of claim 1, wherein the first system utterance does not inquire directly about personality, and wherein analyzing the first user utterance comprises detecting a personality trait of the individual from a characteristic of the first user utterance to the first system utterance.

9. The method of claim 1, wherein the first system utterance does not inquire directly about gender, and wherein analyzing the first user utterance comprises detecting a gender of the individual from a characteristic of the first user utterance to the first system utterance.

10. The method of claim 1, wherein the providing to the individual the second system utterance further comprises selecting a complexity of the second system utterance based on the mood.

11. A system for obtaining individual profile information from individuals, comprising:
    an individual profile database storing profile information for an individual;
    a network-based application linked to the individual by a network, wherein the network-based application is configured to perform, during an automated session with the individual, steps comprising:
       provide a first system utterance to the individual over the network associated with a line of questioning for obtaining the individual profile information;
       receive a first user utterance from the individual over the network;

analyze characteristics of the first user utterance to yield an analysis based on a temperament, a timing, and a content of the first user utterance;

detect a mood of the individual from a characteristic of the first user utterance to the first system utterance based on the analysis and determine whether the mood meets a termination criteria;

when the mood meets the termination criteria, terminate the line of questioning, continue the session with the individual and defer the obtaining of the individual profile information to a subsequent automated session; and when the mood does not meet the termination criteria, performing steps comprising:

providing a second system utterance to the individual based on the analysis of the temperament, the content, and the timing for the first user utterance, the second system utterance selected from a hierarchy of question options organized by question content, temperament criteria, and timing criteria;

receiving a second user utterance in response to the second system utterance;

determining whether the first user utterance addresses a first category of information in the individual profile database to yield a first determination;

determining, in response to the first determination, a first set of profile information from the first user utterance;

when the first user utterance is adequate and direct, storing the first set of profile information in the individual profile database, and determining if the second user utterance addresses a second category of information in the individual profile database to yield a second determination;

determining, in response to the second determination, a second set of profile information from the second user utterance; and storing the second set of profile information in the individual profile database.

12. The system of claim 11, wherein the network comprises a public switched telephone network including a voice services node.

13. The system of claim 12, further comprising a voice services node that receives a verbal user utterance over a voiced call with the individual, converts the verbal user utterance to user utterance data, and provides the user utterance data to the network-based application.

14. The system of claim 13, wherein the network-based application provides first system utterance data and second system utterance data to the voice services node and the voice services node converts the first system utterance data and the second system utterance data to a first verbal utterance and a second verbal utterance.

15. The system of claim 11, wherein the network comprises the Internet and the first system utterance and the second system utterance are included in a web page display on a computer linked to the Internet and wherein the first user utterance is entered as text through the web page display.

16. The system of claim 11, wherein the network comprises the Internet and the first system utterance and the second system utterance are emails received at a computer linked to the Internet and wherein the first user utterance is a reply email sent from the computer.

17. The system of claim 11, wherein the network-based application is further configured to:

analyze the second user utterance to select a third system utterance; and provide the third system utterance to the individual over the network.

18. The system of claim 11, wherein the first system utterance does not inquire directly about personality, and wherein the network-based application analyzes the first user utterance by detecting a personality trait of the individual from a characteristic of the first user utterance to the first system utterance.

19. The system of claim 11, wherein the first system utterance does not inquire directly about gender, and wherein the network-based application analyzes the first user utterance by detecting a gender of the individual from a characteristic of the first user utterance to the first system utterance.

20. The system of claim 11, wherein the network-based application provides the second system utterance by selecting a time within which to present the second system utterance.

21. The system of claim 11, wherein the network-based application selects the second system utterance by selecting a subject matter for the second system utterance.

22. The system of claim 11, wherein the identity of the individual is known by the network-based application, and wherein the network-based application analyzes the first user utterance by comparing the first user utterance to profile information previously stored in the individual profile database.

23. The system of claim 11, wherein the providing to the individual the second system utterance further comprises selecting a complexity of the second system utterance based on the mood.

* * * * *